Figure 1:
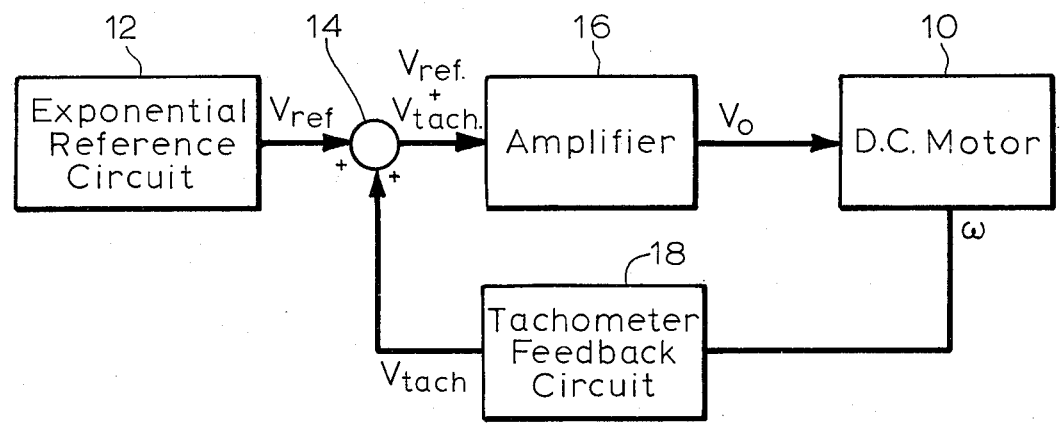

United States Patent [19]
Brodhag et al.

[11] 3,909,686
[45] Sept. 30, 1975

[54] MOTOR CONTROL SYSTEM WITH EXPONENTIAL REFERENCE SOURCE FOR MAINTAINING A CONSTANT LINEAL SPEED OF A FILM BEING WOUND ON A REEL

[75] Inventors: Jeffrey A. Brodhag, Arcadia; Lawrence H. Rehurek, San Gabriel, both of Calif.

[73] Assignee: Bell & Howell Company, Chicago, Ill.

[22] Filed: July 2, 1973

[21] Appl. No.: 376,055

[52] U.S. Cl. ............................ 318/163; 318/328
[51] Int. Cl. ........................................ G05b 17/02
[58] Field of Search.... 318/326, 327, 328, 162–164, 318/391, 397, 398, 308, 364, 365, 6, 7

[56] References Cited
UNITED STATES PATENTS

| | | | |
|---|---|---|---|
| 2,891,206 | 6/1959 | Dillonaire | 318/163 |
| 3,332,007 | 7/1967 | Livengood | 318/447 |
| 3,606,201 | 9/1971 | Petusky | 318/7 |

*Primary Examiner*—Robert K. Schaefer
*Assistant Examiner*—John J. Feldhaus
*Attorney, Agent, or Firm*—James B. Blanchard; Jerold A. Jacover

[57] ABSTRACT

A motor control system for film or web handling apparatus. The motor control system achieves constant lineal speed of the film or web without capstan drive by controlling the speed of the take-up reel drive motor according to an exponentially decreasing RC capacitor discharge curve at a speed reference to compensate for increasing film or web convolution diameter on the take-up reel as film or web is wound onto the take-up reel.

1 Claim, 2 Drawing Figures

MOTOR CONTROL SYSTEM WITH EXPONENTIAL REFERENCE SOURCE FOR MAINTAINING A CONSTANT LINEAL SPEED OF A FILM BEING WOUND ON A REEL

This invention relates to web handling apparatus and, in particular, to a motor control system for web handling apparatus.

In web handling apparatus such as motion picture film processors and projectors, it may be desirable to provide a capability for driving the film at a constant lineal speed without the use of a direct capstan drive. It is a principal object of the present invention to provide a system for effecting such constant lineal film speed by controlling the speed of the film take-up reel.

It is a specific object of the present invention to provide a closed loop motor control system having a capacitor discharge circuit to establish a non-linear gradually decreasing motor speed reference to enable constant lineal speed web movement control by compensating for the increasing convolution diameter as the web is wound onto a reel.

It is another object of the present invention to provide a motor control system for web handling apparatus which includes a capacitor discharge circuit for providing a speed reference signal, motor speed feedback means for providing a feedback signal indicative of actual motor speed, running means for running the speed reference signal and the feedback signal to provide an error signal indicative of the difference between the speed reference signal and the feedback signal, and amplifier means for amplifying the error signal to provide a motor control signal.

These and other objects and features of the present invention will be better understood by reference to the following detailed description taken in conjunction with the accompanying drawings.

In the drawings:

FIG. 1 is a block diagram of a motor control system in accordance with the present invention.

Figure 2:
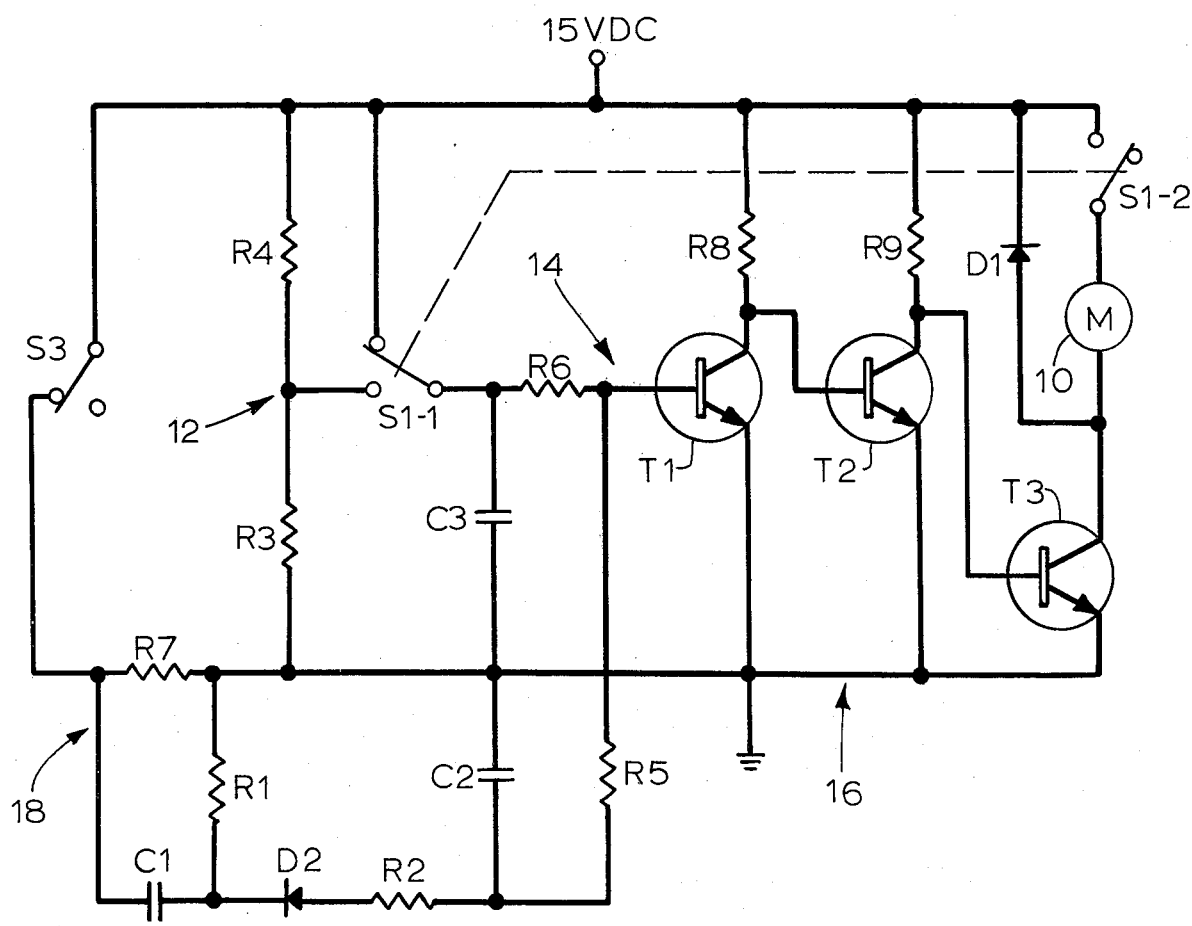

FIG. 2 is a schematic diagram of a motor control circuit for implementing the block diagram of FIG. 1. Referring first to FIG. 1, a closed-loop motor control system is shown for controlling the rotational speed of a web or film take-up reel at an exponentially decreasing rate so as to compensate for the increasing diameter of the outer film convolution as film is progressively wound onto the take-up reel. The system shown is based on the discovery that the exponential RC discharge curve of a capacitor discharge circuit can be employed to provide an exponentially decreasing speed reference for control of the rotational speed of the take-up reel in a manner which will properly compensate for increasing film convolution diameter in order to achieve constant lineal speed of the web or film. Under constant torque load, an open loop system could be used with an RC discharge function voltage as the motor driving voltage. Under variable torque load conditions a closed loop system is required. Such a closed loop system is shown in FIG. 1.

The system of FIG. 1 makes use of a DC motor 10 for driving the take-up reel. The system functions to control the driving voltage Vo for the DC motor and, hence, the motor speed w since there is a direct relationship between the motor driving voltage Vo and the motor speed so long as the torque rating of the DC motor is not exceeded. Accordingly, a DC motor should be selected whose torque rating exceeds the maximum operating torque load expected to be placed on the DC motor.

The exponential reference circuit 12 is a capacitor discharge circuit with a speed reference voltage signal $V_{ref}$ in the form of an exponentially-descreasing RC discharge voltage. The speed reference voltage $V_{ref}$ is summed at a running point 14 with a tachometer-generated motor speed feedback voltage $V_{tach}$ indicative of actual motor speed to provide an error signal $V_{ref} + V_{tach}$ for submission to an amplifier 16.

The motor speed feedback signal $V_{tach}$ is provided by a tachometer feedback circuit 18 which, as described further on with reference to FIG. 2, preferably makes use of a suitable tachometer contactor driven by the motor 10 to produce a certain number of square wave voltage pulses with each revolution of the motor 10. The square wave pulses are preferably differentiated in the tachometer feedback circuit 18 with a set time constant to provide a constant width pulse for each square wave independent of the particular speed at which the motor is running. These pulses are thus integrated in the tachometer feedback circuit 18. to produce an average voltage $V_{tach}$ directly related to the actual speed of the motor 10, but of reversed polarity with respect to the speed reference voltage $V_{ref}$.

Accordingly, when the speed reference voltage $V_{ref}$ and the motor speed feedback signal are summed at the summing point 14, their difference produces an error voltage which is directly indicative of the error between the ideal speed of the motor and the actual speed of the motor. This error voltage is amplified and used as the drive voltage for the motor 10, forcing the motor 10 to run at the proper speed regardless of torque variation.

Referring now to FIG. 2, there is shown a schematic diagram of a circuit for implementing the system of FIG. 1 in accordance with the present invention. The take-up reel DC drive motor is again designated by the reference numeral 10 provided with a diode D1 which normally back-biased during motor operation but provides a short path for undesired transient voltage spikes.

The exponential reference circuit 12 of FIG. 1 is provided in FIG. 2 by the resistors R3 and R4 and the capacitor C3. Prior to operation of the circuit for motor control, the capacitor C3 must be fully charged by the 15 volt DC supply by positioning the switch S1-1 in the position shown in FIG. 2. It should be noted at this juncture that the switch S1-1 is ganged to move with motor switch S1-2 as indicated by the ganged connection shown by the dashed line in FIG. 2. With the capacitor C3 fully charged, the circuit can be placed in operation by switching the ganged switch S1-1 and S1-2 so that the switch S1-2 places the motor 10 in circuit with the 15 volt DC supply and the switch S1-1 connects the underground lead of capacitor C-3 to the junction of resistors R3 and R4 to begin discharging to provide an exponentially decreasing speed reference voltage signal.

The tachometer feedback circuit 18 of FIG. 1 comprises in FIG. 2 the normally-closed tachometer contactor S3, the differentiating network of capacitor C1 and resistor R1 connected across the voltage drop resistor R7, the coupling dioxide D2, and the integrating network of resistor R2 and capacitor C2. The normally closed tachometer contactor S3 is suitably driven by the motor 10 to open preferably four times per revolution of the motor 10. At motor speeds in the range of 2,000 to 5,000 r.p.m. (using a 10 to 1 gearing ratio from the motor shaft to the reel shaft), an RC time constant of .10 millisecond for the differentiating network of R1 and C1 is considered effective to convert the square wave voltage pulses provided by the tachometer switch S3 to constant energy pulses of time width independent of motor speed. The coupling diode D2 passes the negative-going pulse from the differentiator R1, C1 to the integrator R2, C2 which at a RC time constant of 10.2 milliseconds yields an average voltage in the form of a negative DC voltage level proportioned to speed with a ripple component superimposed on the DC voltage level.

A speed reference signal coupling resistor R6 and a motor speed feedback coupling resistor R5 are connected at the base of NPN transistor T1 to form the summing point 14 of FIG. 1.

The amplifier 16 of FIG. 1 comprises in FIG. 2 the grounded-emitter NPN transistors T1, T2, and T3 together with associated bias resistors R8 and R9. The final stage transistor T3 has its collector-emitter circuit connected in series with the DC motor 10 for determining the drive voltage across the motor 10 and, hence, the operating speed of motor 10.

With the circuit of FIG. 2 in operation, the negative DC level of the motor speed feedback signal from the tachometer feedback circuit 18 tends to cancel the positive DC level of the speed reference signal from the exponential reference circuit 12 at the summing point 14. Because of the high voltage gain in the amplifier 16, the ripple previously referred to appearing in the motor speed signal switches the motor voltage on and off at a frequency proportional to the frequency of the pulses from the tachometer contactor S3 while (1) tending to increase the overall motor voltage and motor speed should the motor speed feedback signal tend to be less than the speed reference signal and (2) tending to decrease the overall motor voltage and motor speed should the motor speed feedback signal tend to exceed the speed reference signal. In this manner, the motor 10 is forced to run at the exponentially decreasing speed commanded by the speed reference signal regardless of torque variation. The increasing convolution diameter of film on the take-up reel can thus be compensated for to drive the film at a constant lineal speed.

It will be recognized by those skilled in the art that modifications and changes may be made in the foregoing exemplary embodiment of the present invention without departing from the scope of the invention. For example, under conditions of constant torque load open-loop control may be used by eliminating the tachometer feedback circuit.

What is claimed is:

1. In a film handling apparatus including a drive motor for driving a take-up reel, a motor control system comprising:

exponential reference circuit means for providing an exponentially changing speed reference signal correlated to the increasing film convolution diameter as film is wound onto said reel;

motor speed feedback means including means driven by said drive motor to produce pulses at a frequency indicative of the actual speed of said drive motor, differentiating means for differentiating said pulses to produce differentiated pulses at a frequency indicative of actual motor speed but of substantially constant time width, and integrating means for integrating said differentiated pulses to produce said feedback signal indicative of actual motor speed; and circuit means for controlling the speed of said drive motor as a function of said speed reference signal and said feedback signal such that the lineal speed of said web toward said reel is constant, said circuit means including summing means for summing said speed reference signal and said feedback signal to produce an error signal indicative of the difference in magnitude between said signals, and amplifier means for amplifying said error signal to produce a motor control signal.

* * * * *

UNITED STATES PATENT OFFICE
CERTIFICATE OF CORRECTION

Patent No. 3,909,686        Dated September 30, 1975

Inventor(s) BRODHAG ET AL.

It is certified that error appears in the above-identified patent and that said Letters Patent are hereby corrected as shown below:

Column 1, line 42, after "FIG. 1." should begin a new paragraph.

Column 2, line 23, after "18" delete the period "."

line 39, after the word "which" add the word --is--.

line 56, change "underground" to --ungrounded--.

line 65, change "dioxide" to --diode--.

line 9, change "pulse" to --pulses--.

Signed and Sealed this sixteenth Day of March 1976

[SEAL]

Attest:

RUTH C. MASON
*Attesting Officer*

C. MARSHALL DANN
*Commissioner of Patents and Trademarks*